United States Patent [19]

Koai

[11] Patent Number: 4,934,776
[45] Date of Patent: Jun. 19, 1990

[54] ULTRA-HIGH-EXTINCTION CASCADED COUPLED-WAVEGUIDE OPTICAL MODULATORS AND OPTICAL GATE ARRAYS

[75] Inventor: Kwang T. Koai, Acton, Mass.

[73] Assignee: GTE Laboratories Incorporated, Waltham, Mass.

[21] Appl. No.: 289,658

[22] Filed: Dec. 23, 1988

[51] Int. Cl.$^5$ ............................................. G02B 6/10
[52] U.S. Cl. .................................................. 350/96.14
[58] Field of Search ................ 350/96.12, 96.13, 96.14

[56] References Cited

U.S. PATENT DOCUMENTS 4,273,411  6/1981  Alferness .......................... 350/96.14
4,815,803  3/1989  Faulkner et al. .................. 350/96.14

OTHER PUBLICATIONS

R. C. Alferness, "Waveguide Electro-optic Modulators," IEEE Trans. on Microwave Theory and Techniques, MTT-30, pp. 1121–1137, (1982).
K. Takizawa, "Electro-optic Cutoff Modulator Using . . . Asymmetric Strip Electrodes," Optics Letters, 11, pp. 818–820, (1986).
Granestrand et al, "Strictly Nonblocking 8×8 Integrated Optical Switch Matrix", "Electronic Letters", 22, pp. 816–817, (1986).

Primary Examiner—Frank Gonzalez
Assistant Examiner—Phan T. Heartney
Attorney, Agent, or Firm—James J. Cannon, Jr.; Victor F. Lohmann, III

[57] ABSTRACT

An integrated optical intensity modulator is constructed by cascading individual waveguide directional coupler sections, each having a primary and secondary waveguide and a pair of uniform electrodes. A modulator normally operating in an OFF state has a bar-type structure such that the primary waveguides form one complete and straight waveguide. An input optical signal applied to this modulator propagates straight through the device. Another modulator structure normally operating in an ON state has a cross-type configuration which operates such that the coupled signal from one coupler section serves as the input signal for a next section. Each modulator is driven from its normal state into an opposite state by applying a voltage to the electrodes for inducing changes in the refractive index profile. A plurality of the optical modulators are fabricated in parallel on an integrated optical wafer to form a high-density optical gate array.

23 Claims, 3 Drawing Sheets

ULTRA-HIGH-EXTINCTION CASCADED COUPLED-WAVEGUIDE OPTICAL MODULATORS AND OPTICAL GATE ARRAYS

FIELD OF THE INVENTION

This invention pertains to optical devices and more particularly to integrated optical intensity modulators and the optical gate arrays fabricated from them.

BACKGROUND OF THE INVENTION

Integrated-optic intensity modulators with high ON/OFF extinction ratios are key components for applications in optical communication and signal processing. R.C. Alferness in IEEE Transcations on Microwave Theory and Techniques, 1982, discussed conventional devices such as Mach-Zehnder interferometric modulators, uniform directional couplers, reverse $\Delta\beta$ couplers, X-switches, and cutoff moduolators for use as optical intensity modulators. Among such devices, the highest extinction ratio ever achieved (greater than 56 dB) was obtained in an electrooptic cutoff modulator with asymmetric strip electrodes as reported by K. Takizawa in Optics Letters, 1986. Unfortunately, waveguide cutoff modulators usually incur a very large insertion loss and require a very high drive voltage for high-extinction operations, thus making their system applications impractical. For other conventional devices, where the achievable extinction ratio is normaly in the range of 15–30 dB, it is rather difficult to obtain higher extinction ratios since critical disign and fabrication are required.

OBJECTS OF THE INVENTION

Accordingly, it is a primary object of this invention to obivate the above noted and other disadvantages of the prior art.

It is a further object of this invention to provide a new class of integrated-optic intensity modulators called cascaded coupled-waveguide (CCW) modulators which achieve ultra-high extinction ratios.

It is a further object of this invention to provide a new class of optical gate arrays fabricated from these CCW modulators.

It is a yet further object of this invention to provide a new class of integrated-optic intensity modulators having extra fabrication and control tolerances which make mass production economically feasible.

SUMMARY OF THE INVENTION

In one aspect of the present invention, an integrated optical intensity modulator normally operating in an OFF state is constructed from a plurality of individual directional waveguide coupler sections each having a primary and secondary waveguide forming a coupling region therebetween and a pair of uniform electrodes. The sections are cascaded to form a bar-type structure in which the primary waveguides together form a complete and straight waveguide. This allows an input optical signal in the primary waveguide to propagate straight through the modulator, whereas optical signals coupled from the primary waveguide into the corresponding secondary waveguide are guided out of the modulator through waveguide bends. A means for driving said modulator into a ON state is to apply a control voltage to the electrodes for inducing a change in the refractive index profile of all the coupler sections.

In another aspect, an integrated optical intensity modulator normally operating in an ON state includes a different plurality of individual directional waveguide coupler sections in a cascaded arrangement. Each section includes a primary waveguide having a bend structure and a secondary waveguide forming a coupling region therebetween and a pair of uniform electrodes wherein each secondary waveguide is continguous with the primary waveguide in a next section. Each of these directional coupler sections operates in a cross-state so that an optical signal coupled into the secondary waveguide of one section from the corresponding primary waveguide propagates into the primary waveguide of the next section, and the remaining uncoupled signal present in the primary waveguide of the one section propagates out of the modulator through the respective waveguide bend. A means for driving said modulator into an OFF state is to similarly apply a control voltage to the electrodes for inducing a change in the refractive index profile of all the sections. The input optical signal propagating throught the modulator experiences optical power crossover into the secondary waveguide of each section before reaching the output end. The degree of optical power crossover obviously depends on whether the device is in an ON or OFF state.

In a further aspect of the present invention, a plurality of optical intensity modulators are placed in parallel on an integrated optical wafer by a fabricating means. The optical modulators can be bar-type or cross-type structure. A means for operating the modulators includes a means for driving the modulator into one of its two operating states by applying a uniform control voltage to each of the respective electrodes, thereby simultaneously changing the refractive index profile of all sections.

DETAILED DESCRIPTION OF THE PREFERRED EMBODIMENT

Figure 1A:
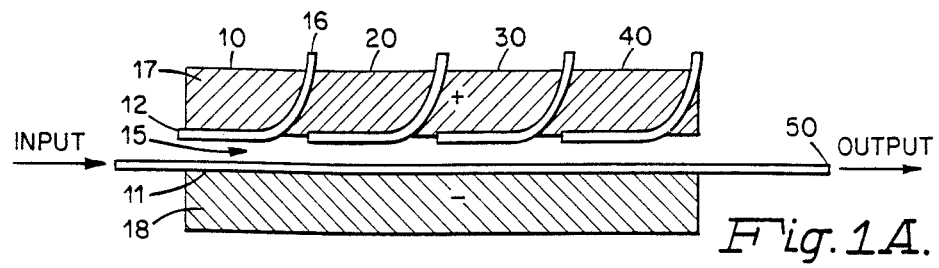
FIGS. 1A and 1B show an upper view of two preferred embodiments of the present invention: a bar-type cascaded coupled-waveguide (CCW) modulator and a cross-type CCW modulator, respectively.
Figure 1B:
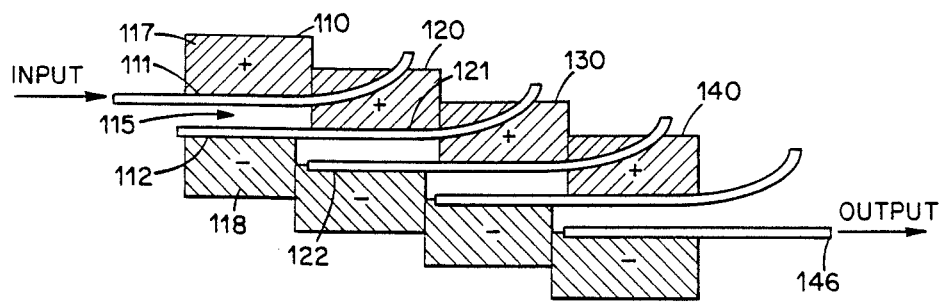

In FIG. 1A is shown an upper view of a bar-type optic intensity modulator with rank=4 in accordance with one embodiment of the present invention, while FIG. 1B shows an alternate embodiment with a cross-type modulator also having rank=4. The rank of the optical devices, hereinafter referred to as cascaded coupled-waveguide (CCW) modulators, is defined as the number of directional-waveguide coupler sections cascaded together. The rank is chosen to be four for exemplary purposes only, and should not serve as a limitation of the CCW modulator. It should be apparent to those skilled in the art that the rank parameter can have any value. In both types of CCW modulators, each section can be considered to be an individual optical directional waveguide coupler. The modulator in FIG. 1A is described as bar-type because its structure provides a direct optical connection between an input and output end of the modulator such that an input signal can propagate straight through the modulator. Comparatively cross-type refers to a modulator structure where the optical signal coupled from the primary to the secondary waveguide in one section serves as the input signal to the primary waveguide in the next section. The switched states of all the sections belonging to a single modulator are controlled unanimously and simultaneously by changing the refractive index via electrooptic effect, nonlinear effect, or other related processes.

Referring to the bar-type modulator in FIG. 1A, four coupled-waveguide sections labeled 10, 20, 30, and 40 are cascaded together. In other embodiments, a plurality of sections may be used. Section 10 consists of a coupling region 15 having a primary waveguide 11 and secondary waveguide 12 fabricated on a crystal substrate with a pair of uniform electrodes 17 and 18 placed on top of (or adjacent to) the waveguides. The remaining coupled-waveguide sections 20, 30, and 40 are similarly structured. Primary waveguide 11 and secondary waveguide 12 form a coupling region 15 over a finite interval of section 10. The primary waveguides form one complete and straight waveguide which extends the length of the modulator while each secondary waveguide has a bend structure as shown for guiding coupled light out of the modulator. Preferably, the electrodes from each section are part of a singular electrode structure. Furthermore, the modulator in FIG. 1A is a normally OFF-state device, which means that it operates in an OFF state when no control signal is applied to the electrodes.

In rerference to the OFF state mode for the modulator in FIG. 1A, and input optical signal initially propagates through primary waveguide 11 while a substantial portion (if not all) of the signal is coupled into secondary waveguide 12 and subsequently discarded when it appears at output end 16 of waveguide 12. The uncoupled signal remaining in primary waveguide 11 propagates through the primary waveguides of all subsequent sections 20, 30, and 40 before exiting through output end 50 of the primary waveguide in section 40 while a substantial portion of the uncoupled signal present in each primary waveguide is coupled into a corresponding secondary waveguide and also discarded. The OFF state operation is therefore achieved since the light signal at output end 50 has a very low (if any) intensity level.

The modulator is driven into its ON state by simultaneously applying a uniform control voltage to the electrodes in each section for inducing a simultaneous change in the transverse refractive index profile of all the sections. This results in very little optical power crossover between the primary and secondary waveguides of each section as an optical signal propagates through the modulator. Again referring to FIG. 1A, but now addressing the ON state operation, the input optical signal propagates through the primary waveguide of each section and is negligibly coupled into each corresponding secondary waveguide. Consequently, the input signal essentially preserves its intensity level as it propagates through the modulator. This performance, in combination with that of the OFF state, results in an ultra-high extinction ratio.

FIG. 1B shows an alternate embodiment of the present invention involving a cross-type CCW modulator having four cascaded directional waveguide coupler sections 110, 120, 130, and 140. This modulator is illustrative of other modulator stuctures which may be constructed from a selectable number of directional waveguide coupler sections. The structure of section 110 is representative of each section. Section 110 includes a primary waveguide 111 and a corresponding secondary waveguide 112 forming a coupling region 115 therebetween over a finite length of section 110. The waveguides are fabricated on a crystal substrate with a pair of uniform electrodes 117 and 118 placed adjacent to (or on top of) the waveguides. In addition, section 120 has a primary waveguides 121 and a secondary waveguide 122. The modulator is designed so that the secondary waveguide from one section and the primary waveguide from a next section form a single waveguide. For example, secondary waveguide 112 of section 110 is continguous with primary waveguide 121 of sections 120. The result is that an optical signal coupled from the primary waveguide into the corresponding secondary waveguide of one section serves as an input signal for the next section when it propagates into the primary waveguide of this next section. The modulator in FIG. 1B is a normally ON-state device, which means that it operates in an ON state when no control voltage is to the electrodes.

In the ON state mode for the modulator in FIG. 1B, an input light signal initially propagates through primary waveguide 111 and is substantially coupled into secondary waveguide 112. The bend in primary waveguide 111 guides the uncoupled signal (if any) out of the modulator. The coupled signal then propagates through primary waveguide 121 of the next section 120 whereupon the signal is similarly substantially coupled into secondary waveguide 122. The uncoupled signal remaining in waveguide 121 (if any) is also guided out of the modulator via a waveguide bend in waveguide 121. For each of the remaining coupled-waveguide sections, the coupled signal present in the secondary waveguide of one section propagates through the primary waveguide of a next section and it substantially coupled into the secondary waveguide of this next section. The uncoupled signal is discarded through a waveguide bend in the primary waveguide while the coupled signal proceeds to a next section. As a result of the substantial coupling between the primary and secondary waveguide in each section, the input signal experiences negligible loss in intensity level as it propagates through the device and exits through port 146 of the secondary waveguide in the last section 140.

The modulator is driven into its OFF state by simultaneously applying a uniform control voltage to the electrodes in each section for inducing a simultaneous change in the transverse refractive index profile of all the sections. The result is that negligible optical power crossover will occur between the primary waveguide and corresponding secondary waveguide in each section as an optical signal propagates through the primary waveguide. A substantial portion of the signal present in the primary waveguide will therefore remain uncoupled and subsequently propagate through the bent portion of the primary waveguide and exit the device. As a result, the input signal has a substantially reduced intensity level when it appears at output port 146.

The operational performance of the cascaded coupled-waveguide modulators in the present invention can be calculated using traditional coupled-mode analysis. The results for an exemplary rank-5 bar-type CCW modulator are shown in curve 10 of FIG. 2, while the results for rank-1 and rank-5 cross-type CCW modulator are shown in curves 20 and 30, respectively, of FIG. 3. Referring to the graphs, the abscissa represents a control signal, $\Delta$-B*L, proportional to applied voltage and the ordinate represents relative output intensity in dB. As an example calculation for a rank-5 modulator, assume that each individual waveguide coupler in both types of CCW modulators has an extinction ratio X and an excess loss E. The ON/OFF extinction ratio $X_k$ and the excess loss $E_k$ of a rank-k CCW modulator are $X_k = X \times k$ and $E_k = E \times k$, respectively. With k=5 and X=20 dB, $X_5$ can be as large as 100 dB. A value of 0.5 dB for $E_5$ is possible as recent results by Granestrand et al., Electronic Letters, 1986, have shown that E is about only 0.1 dB. When considering a waveguide-fiber coupling loss of 0.5 dB per facet and a material propagation loss of 0.2-0.3 dB/cm, a CCW modulator on a 6 cm-long can have an insertion loss of 2.7-3.5 dB.

Figure 2:
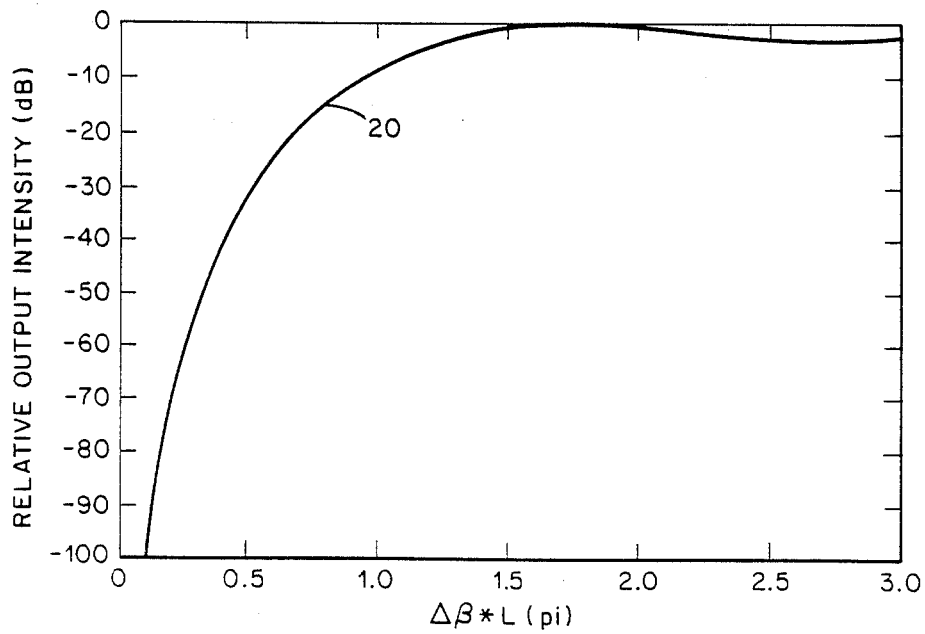
FIGS. 2 and 3 are the characteristic curves of the CCW modulators in FIGS. 1A and 1B, respectively.
Figure 3:
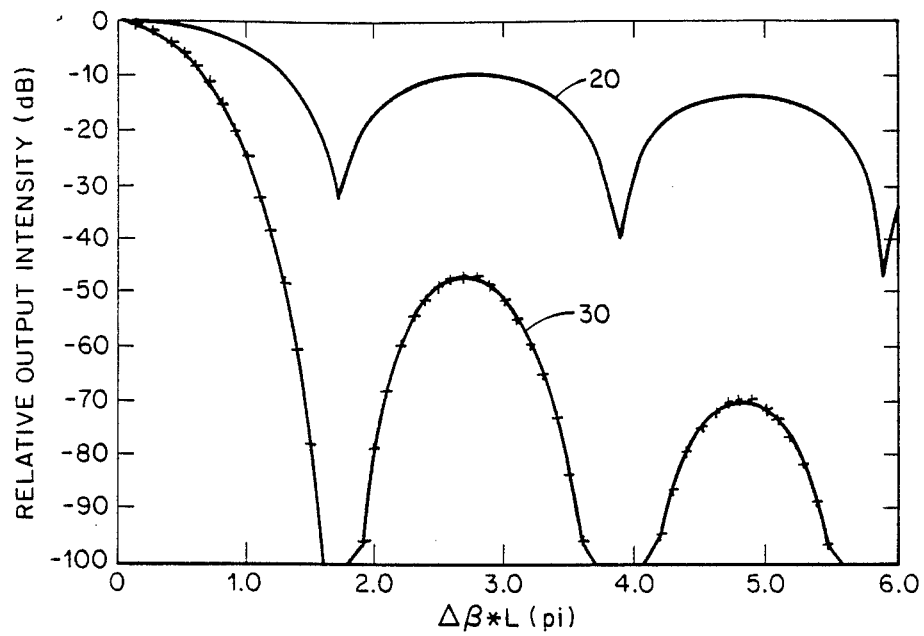

Since the horizontal axes of FIG. 2 and FIG. 3 represent the control signals of the CCW modulators, these characteristic curves can be used to evaluate the control tolerances. It is obvious that even with control signal variations as large as 10 percent, the rank-5 CCW modulators can still maintain an extinction ratio at the 100 dB level. It is estimated the CCW modulators with a 10 percent control tolerance and with a greater than 60 dB extinction ratio can be mass produced easily by the current lithium niobate technology. Such electrooptic CCW modulators do not require larger control voltages in comparison with conventional uniform-electrode directional couplers.

Figure 4:
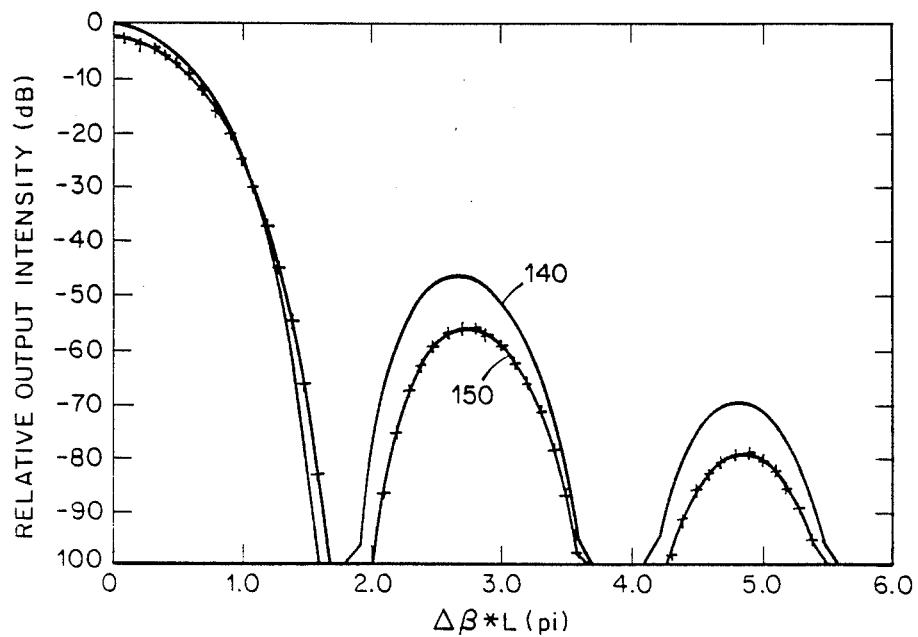
FIG. 4 is a graphical comprarison of two cross-type CCW modulators with different coupler lengths in accordance with the present invention.

The critical fabrication requirements associated with optical devices based on directional couplers are relieved by the new designs of the present invention. This is illustrated in FIG. 4, which compares the output characteristics for two cross-type CCW modulators having coupler lengths $L = L_c$ (curve 140) and $L = 0.8 L_c$ (curve 150). Similar results can be obtained for the case of $L = 1.2 \times L_c$. FIG. 4 shows that a CCW modulator can maintain the same high extinction ratio with only a small increase in insertion loss (typically a few dB) when a 20% fabrication tolerance is specified.

Figure 5:
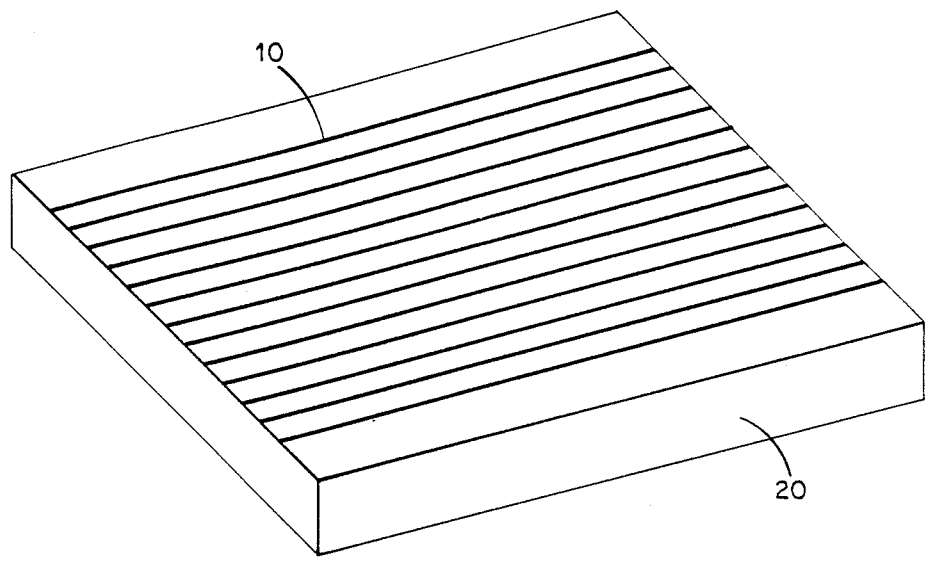
FIG. 5 is a perspective view of an optical gate array fabricated from the CCW modulators of the present invention.

In FIG. 5, a plurality of CCW modulators 10 are fabricated in parallel on an integrated optical wafer 20 to form a high-density optical gate array. Besides the aforementioned features which accompany the CWW modulators, such optical gate arrays are compact in size, capable of supporting many channels, and manufacturable.

The novel cascaded coupled-waveguide modulator disclosed herein offers superior performance over the prior art in terms of improved extinction ratio and control and fabrication tolerances. This improved extinction ratio is obtainable while only requiring a low drive voltage due to the identical structure of each waveguide section. The present invention also permits flexibility in designing the electrodes for an electrooptic CCW modulator since the full length of an integrated optical crystal can be used. Accordingly, designs for low drive voltage, polarization independence, and the travelling-wave-type electrodes can be implemented. A further embodiment of the present invention would include the fabrication of CCW modulators where the bar-state and cross-state of the coupler sections within the devices are dependent only on the intensity of the input light. Thus, high-extinction nonlinear optical modulators should be feasible, especially for the bar-type structure.

What is claimed is:

1. An integrated optical intensity modulator normally operating in an OFF state and capable of achieving an ultra-high ON/OFF extinction ratio, comprising:
   a plurality of directional waveguide coupler sections cascaded together on a crystal substrate to form a bar-type modulator structure which provides a direct optical connection between the first section and the last section;
   each of said waveguide coupler sections consisting of a primary waveguide and a corresponding secondary waveguide forming a coupling region therebetween wherein each primary waveguide is contiguous with the primary waveguide in a next section;
   each secondary waveguide having a bend structure so that an optical signal coupled into primary waveguide is guided out of said modulator;
   a pair of uniform electrodes placed in close proximity to each of said waveguide coupler sections;
   whereby when said modulator is operating in said OFF state, an input signal entering the primary waveguide of said first section propagates successively through the primary waveguide of each subsequent section while experiencing substantial optical power crossover into each corresponding secondary waveguide; and
   whereby when said modulator is operating in an ON state, said input signal propagates successively through the primary waveguide of each section while very little optical power crossover occurs between each primary waveguide and said corresponding secondary waveguide.

2. The modulator as recited in claim 1 wherein:
   the electrodes are placed on top of said respective waveguides.

3. The modulator as recited in claim 1 wherein:
   the electrodes are placed adjacent to said respective waveguides.

4. The modulator as recited in claim 1 further includes:
   means for driving a modulator into said ON state by applying a uniform control voltage to each of said electrodes, thereby simultaneously changing the refractive index profile of each of said sections.

5. The modulator as recited in claim 1 wherein:
   said primary waveguides form a single waveguide.

6. A high-density optical gate array, comprising:
   a plurality of ON/OFF optical intensity modulators each normally operating in an OFF state;
   each of said optical modulators includes a plurality of directional waveguide coupler sections cascaded together on a crystal substrate to form a bar-type modulator structure which provides a direct optical connection between the first section and the last section;
   each of said waveguide coupler sections includes a primary waveguide and a corresponding secondary waveguide together forming a coupling region therebetween wherein each primary waveguide is contiguous with the primary waveguide in a next section, and further includes a pair of uniform electrodes;
   whereby when a modulator is operating in said normal OFF state mode, an input optical signal propagates successively through the primary waveguide of each section while experiencing substantial optical power crossover into each corresponding secondary waveguide before emerging as an output signal from the primary waveguide of said last section; and whereby when a modulator is operating in an ON state mode, said input signal propagates successively through the primary waveguide of each section while very little optical power crossover occurs between each primary waveguide and said corresponding secondary waveguide.

7. The optical gate array as recited in claim 6 wherein:
each secondary waveguide has a bend structure so that an optical signal coupled into the secondary waveguide from said associated primary waveguide is guided out of said modulator.

8. The optical gate array as recited in claim 6 wherein:
the electrodes are placed on top of said associated waveguides.

9. The optical gate array as recited in claim 6 wherein:
the electrodes are placed adjacent to said associated waveguides.

10. The optical gate array as recited in claim 6 further includes:
means for driving a modulator into said ON state by applying a uniform control voltage to each of said respective electrodes, thereby simultaneously changing the refractive index profile of each of said waveguide coupler sections.

11. The optical gate array as recited in claim 6 wherein:
the primary waveguides associated with each modulator form a single waveguide.

12. The optical gate array as recited in claim 6 further includes:
means for fabricating said modulators in parallel on an integrated optical wafer.

13. A high-density optical gate array, comprising:
a plurality of optical intensity modulators normally operating in an ON state;
each of said optical modulators consists of a plurality of directional waveguide coupler sections cascaded together on a crystal substrate to form a cross-type modulator structure;
each of said waveguide coupler sections includes a primary waveguide having a bend structure and a corresponding secondary waveguide together forming a coupling region therebetweeen wherein each secondary waveguide is contiguous with the primary waveguide in a next section so that an optical signal coupled into the secondary waveguide of one section from said corresponding primary waveguide propagates into the primary waveguide of said next section and the remaining uncoupled signal present in the primary waveguide of said one section propagates out of said modulator through said respective waveguide bend, said coupler section further includes a pair of uniform electrodes;
whereby when a modulator is operating in said normal ON state mode, an input optical signal entering the primary waveguide of said first section propagates successively through each subsequent section so that the optical signal present in each respective primary waveguide experiences nearly complete optical power crossover into the corresponding secondary waveguide; and whereby when a modulator is operating in an OFF state mode, said input optical signal propagates successively through each section so that the optical signal present in each primary waveguide experiences negligible optical power crossover into the corresponding secondary waveguide.

14. The optical gate array as recited in claim 13 wherein:
the electrodes of said modulators are placed on top of said respective waveguides.

15. The optical gate array as recited in claim 14 wherein:
the electrodes of said modulators are placed adjacent to said respective waveguides.

16. The optical gate array as recited in claim 13 further includes:
means for driving a modulator into said OFF state by applying a uniform control voltage to each of said respective electrodes, thereby simultaneously changing the refractive index profile of each of said waveguide coupler sections.

17. The optical gate array as recited in claim 13 wherein:
each secondary waveguide forms a single waveguide with the primary waveguide in said next section.

18. The optical gate array as recited in claim 13 further includes:
means for fabricating said modulators in parallel on an integrated optical wafer.

19. An integrated optical intensity modulator normally operating in an ON state, comprising:
a plurality of ON/OFF directional waveguide coupler sections cascaded together on a crystal substrate to form a cross-type modulator structure;
each of said waveguide coupler sections includes a primary waveguide having a bend structure and a corresponding secondary waveguide together forming a coupling region therebetween wherein each secondary waveguide is contiguous with the primary waveguide in a next section so that an optical signal coupled into the secondary waveguide of one section from said corresponding primary waveguide propagates into the primary waveguide of said next section, and the remaining uncoupled signal present in the primary waveguide of said one section propagates out of said modulator through said respective waveguide bend;
a pair of uniform electordes placed in close proximity to each of said waveguide coupler sections;
whereby when said modulator is operating in said normal ON state mode, an input optical signal enters the primary waveguide of the first section and propagates successively through each subsequent section such that the optical signal present in the primary waveguide experiences nearly complete optical power crossover into the corresponding secondary waveguide, said modulator effectively allowing said input signal to propagate through said modulator with negligible loss in intensity level before exiting through the secondary waveguide of said last section; and whereby when said modulator is operating in an OFF state mode, said input optical signal enters the primary waveguide of the first section and propagates successively through each subsequent section such that the optical signal present in the primary waveguide experiences negligible optical power crossover into the corresponding secondary waveguide.

20. The modulator as recited in claim 19 wherein:
each secondary waveguide forms a single waveguide with the primary waveguide in said next section.

21. The modulator as recited in claim 19 further includes:
means for driving a modulator into said OFF state by appling a uniform control voltage to each of said electrodes, thereby simultaneousoly changing the refractive index profile of each of said sections.

22. The modulator as recited in claim 19 wherein:
the electrodes are placed on top of said respective waveguides.

23. The modulator as recited in claim 19 wherein:
the electordes are placed adjacent to said respective waveguides.

* * * * *